US006967668B2

(12) United States Patent
Byoun et al.

(10) Patent No.: US 6,967,668 B2
(45) Date of Patent: Nov. 22, 2005

(54) MONITOR HAVING AN IMPROVED COMBINING STRUCTURE OF A MAIN BODY AND A BASE MEMBER THEREOF

(75) Inventors: Dae-hyoun Byoun, Seongnam (KR); Young-tae Kim, Yongin (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 321 days.

(21) Appl. No.: 10/200,735

(22) Filed: Jul. 24, 2002

(65) Prior Publication Data

US 2003/0103092 A1 Jun. 5, 2003

(30) Foreign Application Priority Data

Dec. 4, 2001 (KR) .............................. 2001-76173

(51) Int. Cl.[7] .............................................. G09G 3/36
(52) U.S. Cl. ..................................................... 345/905
(58) Field of Search ........................... 345/905, 87, 30, 345/55, 84, 173, 174, 179, 180, 156, 169, 345/176; 361/681, 683; 248/918, 442.2, 248/398, 286.1; 56/341; 439/374; 16/326; 348/794

(56) References Cited

U.S. PATENT DOCUMENTS

| 5,168,429 A | | 12/1992 | Hosoi |
| 5,467,106 A | * | 11/1995 | Salomon ........................ 345/87 |
| D376,355 S | | 12/1996 | Ojeda, IV |
| 5,618,020 A | * | 4/1997 | Hegarty et al. .......... 248/442.2 |
| 6,081,407 A | * | 6/2000 | Khuu ........................ 360/99.06 |
| 6,268,997 B1 | * | 7/2001 | Hong ........................... 361/681 |
| 6,282,082 B1 | * | 8/2001 | Armitage et al. ............ 361/681 |
| 6,326,955 B1 | * | 12/2001 | Ditzik .......................... 345/173 |
| 6,412,848 B1 | * | 7/2002 | Ceccanese et al. ......... 296/37.7 |
| 6,462,781 B1 | * | 10/2002 | Arnold ........................ 348/373 |
| 6,702,604 B1 | * | 3/2004 | Moscovitch ................. 439/374 |
| 2002/0036457 A1 | * | 3/2002 | Kim et al. .................... 313/407 |
| 2002/0088910 A1 | * | 7/2002 | Sweere et al. ............ 248/286.1 |
| 2003/0024073 A1 | * | 2/2003 | Chih et al. ...................... 16/326 |
| 2003/0080949 A1 | * | 5/2003 | Ditzik .......................... 345/173 |

FOREIGN PATENT DOCUMENTS

| CN | 2359731 Y | 1/2000 |
| JP | 6-266472 | 9/1994 |
| JP | 10-275025 | 10/1998 |
| JP | 2000-10654 | 1/2000 |
| KR | 2000-0002781 | 2/2000 |

OTHER PUBLICATIONS

Chinese Office Action dated Mar. 19, 2004.

* cited by examiner

Primary Examiner—Vijay Shankar
Assistant Examiner—Prabodh Dharia
(74) Attorney, Agent, or Firm—Staas & Halsey LLP

(57) ABSTRACT

A monitor includes a main body and a base member supporting the main body. The monitor also includes at least one coupling part protruding from the base member toward the main body, and an elastic supporting member provided at the main body to elastically support the coupling part. Therefore, a monitor in which a base member is easily combined to and removed from a main body has an improved combining structure.

20 Claims, 12 Drawing Sheets

MONITOR HAVING AN IMPROVED COMBINING STRUCTURE OF A MAIN BODY AND A BASE MEMBER THEREOF

CROSS-REFERENCE TO RELATED APPLICATIONS

This application claims the benefit of Korean Application No. 2001-76173, filed Dec. 4, 2001, in the Korean Industrial Property Office, the disclosure of which is incorporated herein by reference.

BACKGROUND OF THE INVENTION

1. Field of the Invention

The present invention relates in general to a monitor, and more particularly, to a monitor improved in a combining structure of a main body and a base member thereof.

2. Description of the Related Art

FIG. 9 is an exploded rear perspective view of a conventional monitor. As shown in FIG. 9, the monitor includes a main body 110 to display a picture thereon, and a base member 120 to support the main body 110.

Opposite sides of the base member 120 are provided with a pair of coupling parts 140, each having a plurality of through holes 140a thereon. Thus, the main body 110 is combined to the base member 120 by a plurality of screws 130 through the through holes 140a provided on the coupling parts 140. In the conventional monitor, the plurality of screws are used to combine the main body 110 with the base member 120, thereby increasing assembling time and lowering productivity.

Further, the monitor is generally packed so that the main body 110 is combined to the base member 120. Therefore, a volume of the package becomes bulky, thereby increasing a cost of storing and carrying the package.

Also, when a user desires to change the monitor from a table-type monitor (e.g., in which the monitor stands on a table via the base member 120) into a wall-type monitor (e.g., in which only the main body 110 hangs on a wall), the screws 130 must be removed one by one, which is inconvenient to the user.

SUMMARY OF THE INVENTION

Accordingly, it is an object of the present invention to provide a monitor in which a base member is easily combined to and removed from a main body thereof.

Another object of the present invention is to provide a monitor in which the main body is easily separated from the base member and enables the main body and the base member to be separately packed, thereby decreasing a volume of the package, and a cost of storing and carrying the package.

Still, another object of the present invention is to provide a monitor which is conveniently changed from a table-type monitor into a wall-type monitor, or vice versa.

Additional objects and advantages of the invention will be set forth in part in the description which follows and, in part, will be obvious from the description, or may be learned by practice of the invention.

The foregoing and other objects of the present invention are achieved by providing a monitor including a main body and a base member supporting the main body. The monitor includes at least one coupling part protruding from the base member toward the main body and an elastic supporting member provided at the main body to elastically support the coupling part.

According to an aspect of the invention, the monitor includes a housing having an opening through which the coupling part is inserted. The housing accommodates the elastic supporting member and supports the elastic supporting member. The monitor also includes a housing accommodating part provided at a rear lower part of the main body to accommodate the housing.

According to an aspect of the invention, the housing includes a front housing part and a rear housing part.

According to another aspect of the invention, the elastic supporting member includes a fixing part fastened to an inside of one of the front and rear housing parts, and a pair of elastic arms spaced from each other at a predetermined distance and deformed elastically transverse to a combining direction of the coupling part to elastically support opposite sides of the coupling part.

According to an aspect of the invention, the elastic arms have bent parts formed in symmetry with each other at a predetermined portion thereof, and the opposite sides of the coupling part are provided with latch grooves latched on the corners of the bent parts. Further, each latch groove has an inclined portion.

According to an aspect of the invention, the elastic supporting member comprises a guiding part extended along a combining direction of the coupling part, being incorporated with the fixing part and the elastic arms as one body, to thereby guide the coupling part.

According to an aspect of the invention, the guiding part is provided with a tool passing hole, and a lower end part of the guiding part is provided with a caught part bent at a predetermined angle and caught in the opening of the housing.

According to an aspect of the invention, one of the front and rear housing parts is provided with fixing ribs spaced from each other at a distance as wide as a width of the guiding part and protruding to catch the guiding part.

According to another aspect of the invention, the one of the front and rear housing parts provided with the fixing ribs is also provided with fixing projections spaced from the fixing ribs at a predetermined distance and disposed between the guiding part and the elastic arms.

According to another aspect of the invention, one of the front and rear housing parts is provided with a plurality of bosses protruding toward the other one, each having a screw hole. Also, one of the front and rear housing parts is provided with a plurality of boss accommodating parts to accommodate the bosses and having through holes to correspond to the screw hole of the respective ones of the plurality of bosses. Therefore, the monitor includes a fixing screw to fasten to the screw hole through the through hole, thereby combining the front and rear housing parts.

According to yet another aspect of the invention, the coupling part is incorporated with the base member, and the base member is provided with a coupling part holder in which the coupling part is partially inserted.

According to another aspect of the invention, the main body includes a front cover and a rear cover which are removably combined to each other, and the elastic supporting member is directly mounted on an inside of one of the front and rear covers.

BRIEF DESCRIPTION OF THE DRAWINGS

These and other objects and advantages of the invention will become apparent and more appreciated from the following description of the preferred embodiments, taken in conjunction with the accompanying drawings of which.

DETAILED DESCRIPTION OF THE PREFERRED EMBODIMENTS

Figure 1:
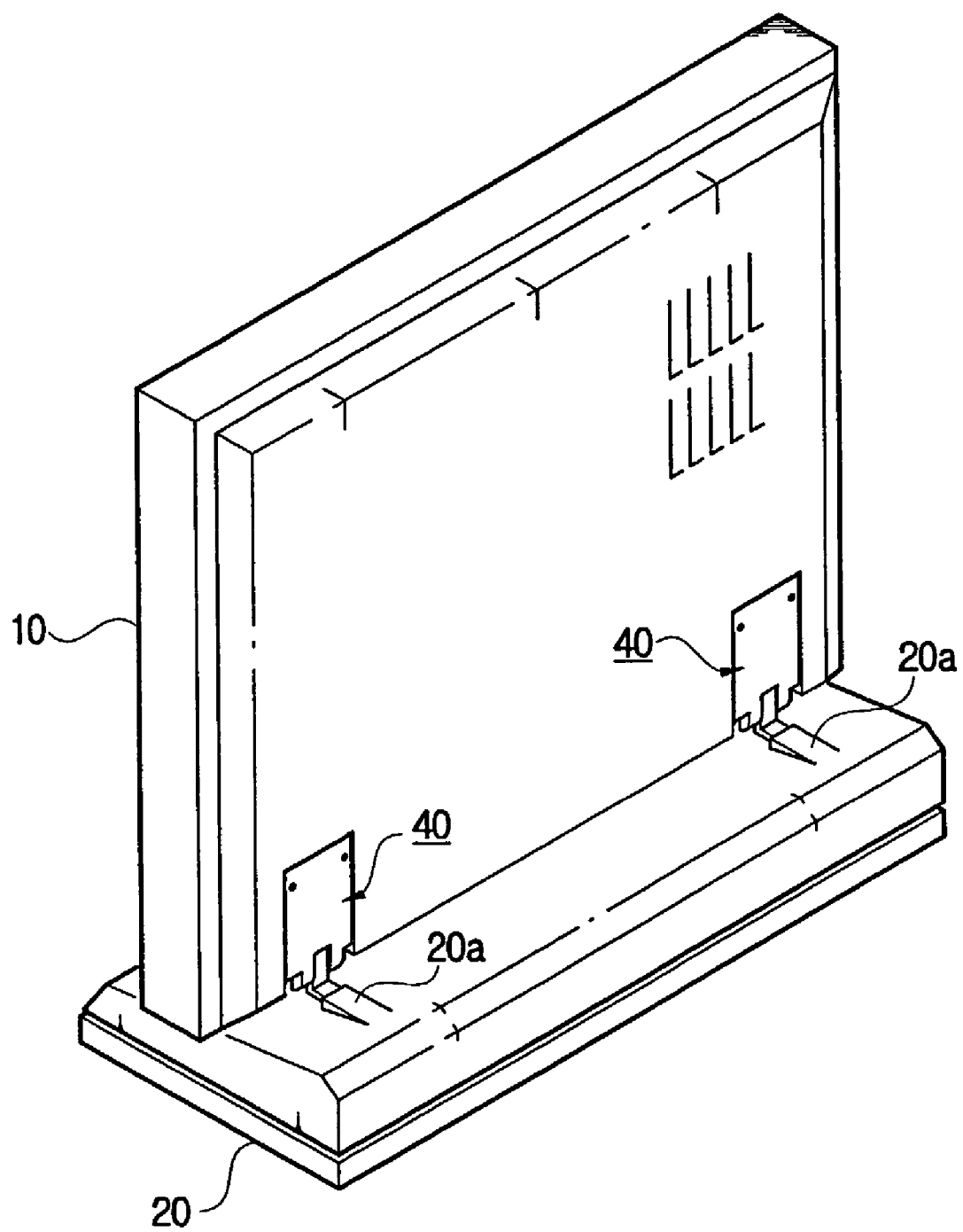
FIG. 1 is a rear perspective view of a monitor having a main body combined to a base member thereof, according to an embodiment of the present invention.

Reference will now be made in detail to the present preferred embodiments of the present invention, examples of which are illustrated in the accompanying drawings, wherein like reference numerals refer to like elements throughout.

Figure 2:
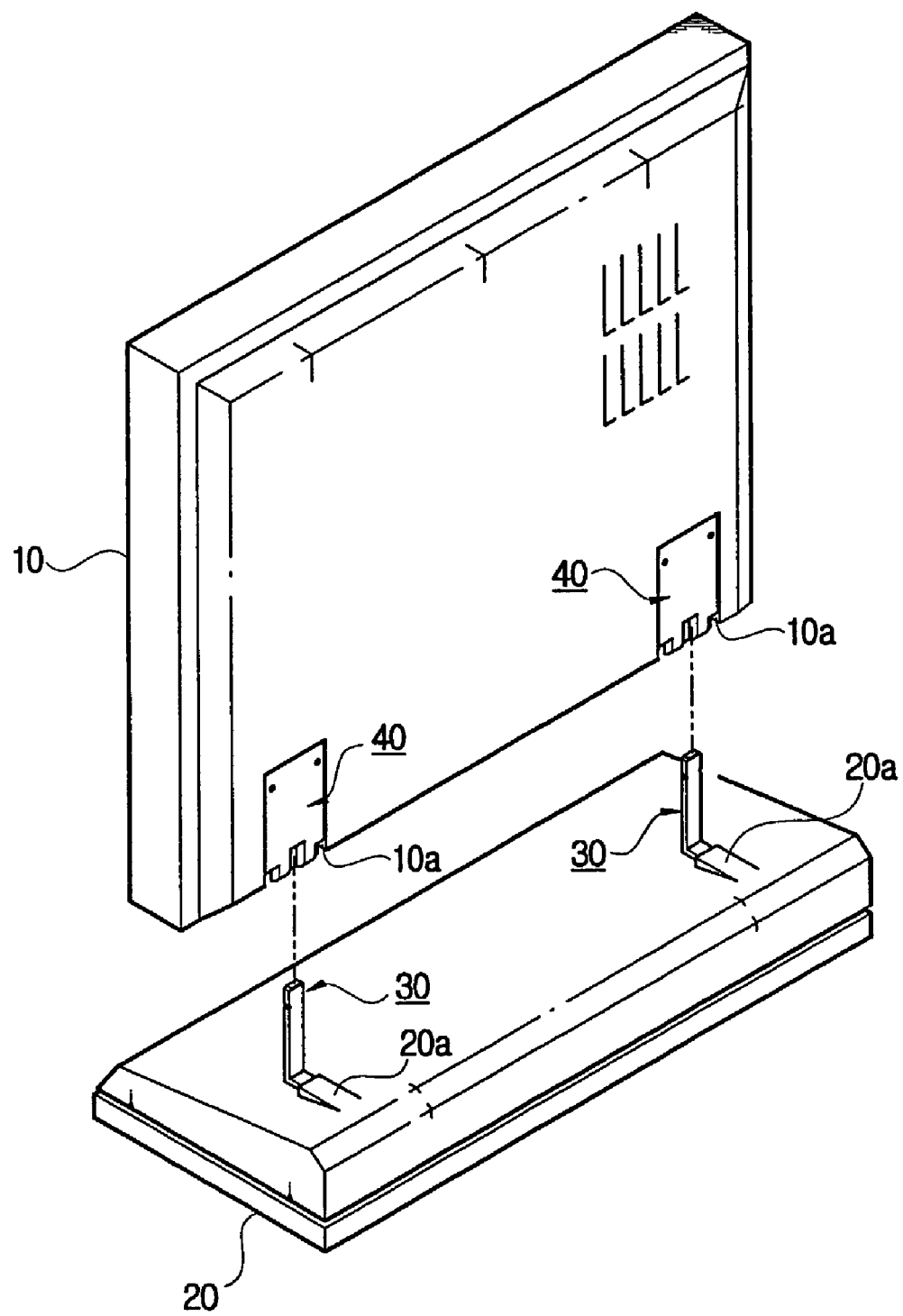
FIG. 2 is a perspective view showing the monitor of FIG. 1 having the main body separated from the base member.

As shown in FIGS. 1 and 2, a monitor according to an embodiment of the present invention includes a main body 10 to display a picture thereon, and a base member 20 to support the main body 10.

A rear lower part of the main body 10 is provided with a pair of housing accommodating parts 10a which are spaced from each other at a predetermined distance. Each housing accommodating part 10a accommodates a housing 40 having an elastic supporting member 60 (see FIG. 4).

The base member 20 is provided with a pair of coupling part holders 20a in which a pair of coupling parts 30 are partially inserted. Opposite sides of a free end of each of the coupling parts 30 are provided with latch grooves 31 (see FIG. 3) on which bent parts 64a (see FIGS. 6A and 6B) of the elastic supporting member 60 are latched. Each of the latch grooves 31 have an inclined portion 31a (see FIGS. 6A and 6B) to allow a corner of the bent parts 64a to be smoothly latched in and released from the latch grooves 31.

Figure 3:
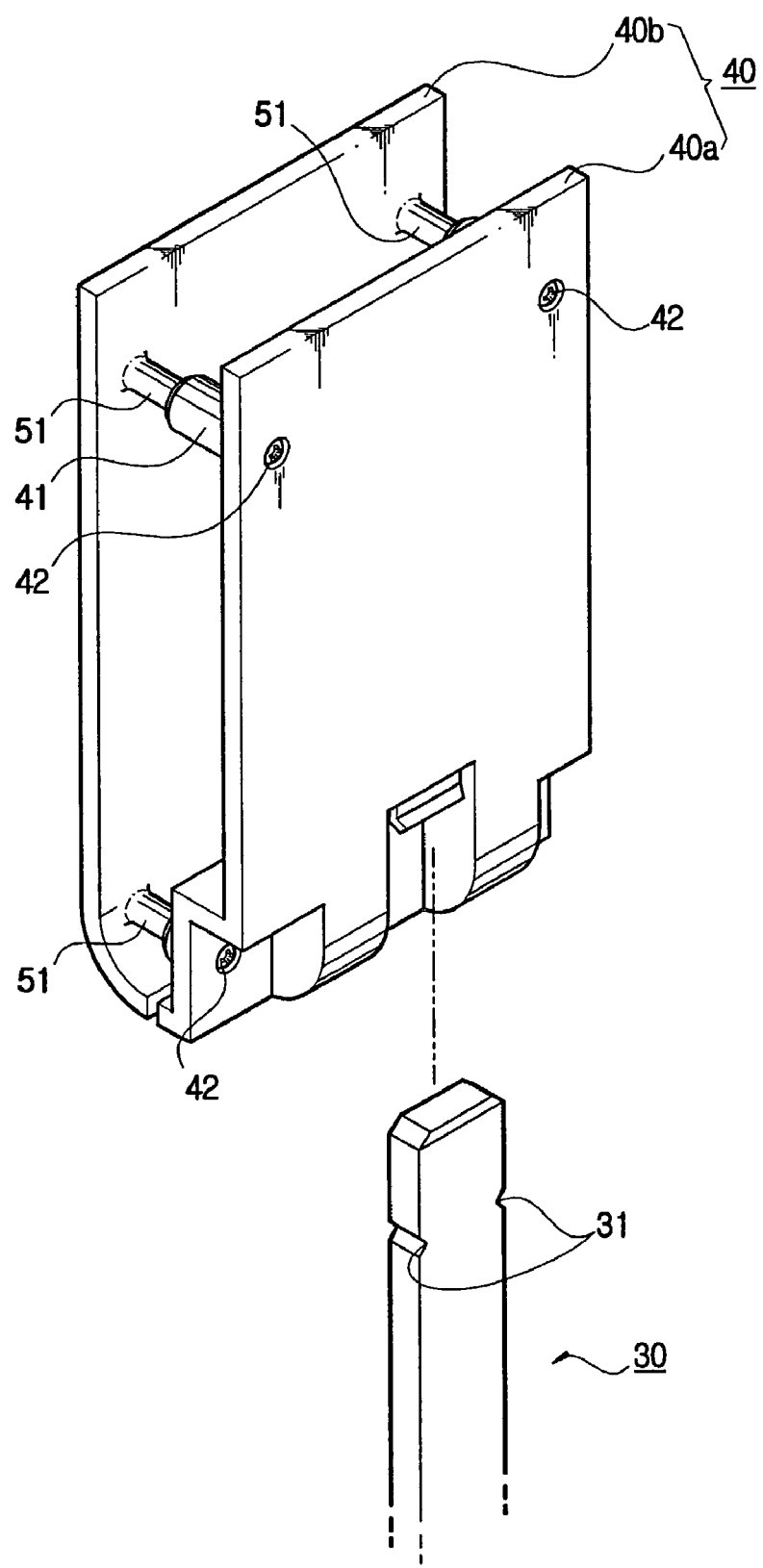
FIG. 3 is an exploded perspective view of a housing joined to the main body and a coupling part joined to the base member.
Figure 4:
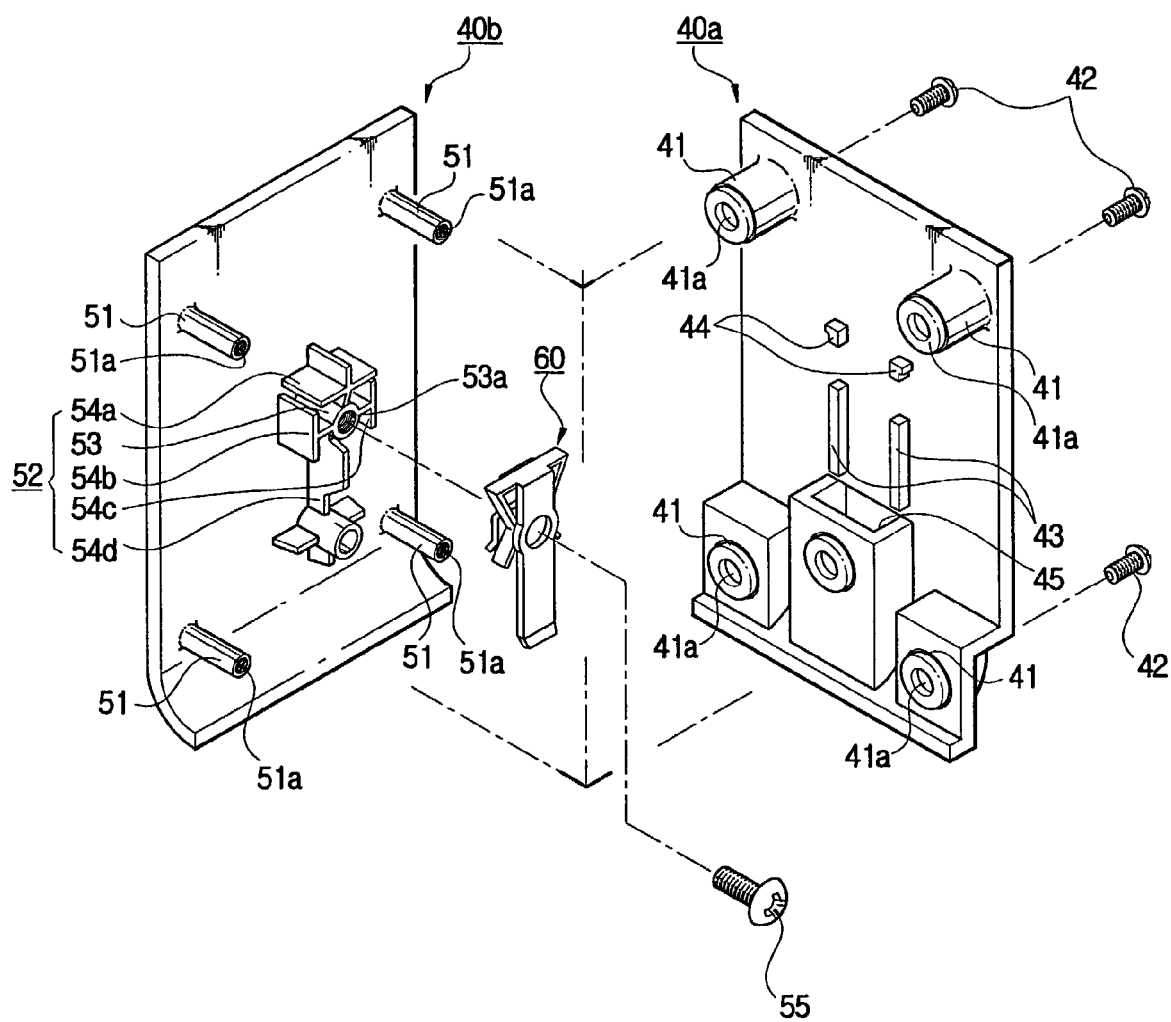
FIG. 4 is an exploded perspective view of the housing of FIG. 3.

As shown in FIGS. 3 and 4, the housing 40 includes a front housing part 40a and a rear housing part 40b which are removably combined to each other. An inside of the rear housing part 40b is provided with a plurality of bosses 51 having a screw hole 51a.

An inside of the front housing part 40a is provided with a plurality of boss accommodating parts 41 to accommodate the bosses 51 of the rear housing part 40b, respectively. Further, each of the boss accommodating parts 41 is provided with through holes 41a corresponding to the respective screw hole 51a provided in the respective boss 51. Thus, fixing screws 42 are inserted from an outside of the front housing part 40a into the through holes 41a, and then fastened to the screw holes 51a of the bosses 51, thereby combining the front housing part 40a with the rear housing part 40b.

The inside of the front housing part 40a is also provided with a pair of fixing ribs 43, which are spaced from each other at a distance as wide as a width of a guiding part 66 (see FIG. 5A) of the elastic supporting member 60, and protruding to prevent the guiding part 66 from moving laterally. A pair of fixing projections 44 disposed between the guiding part 66 and a pair of elastic arms 64 of the elastic supporting member 60, are provided above the fixing ribs 43, respectively. A lower part of the front housing part 40a is provided with an opening 45 through which the coupling parts 30 are inserted.

Figure 5A:
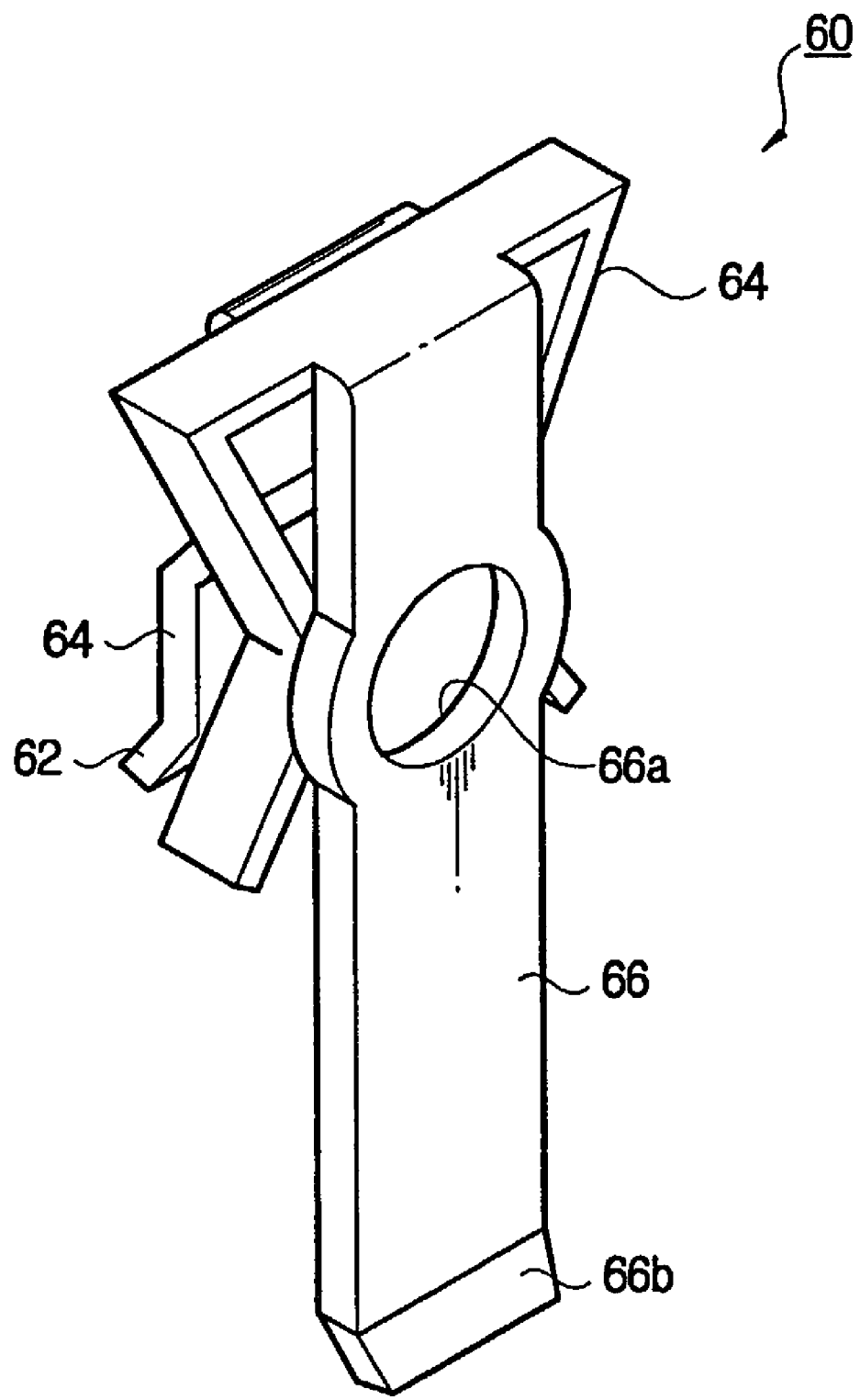
FIGS. 5A and 5B illustrate a perspective view and a front view, respectively, of an elastic supporting member of FIG. 4.
Figure 5B:
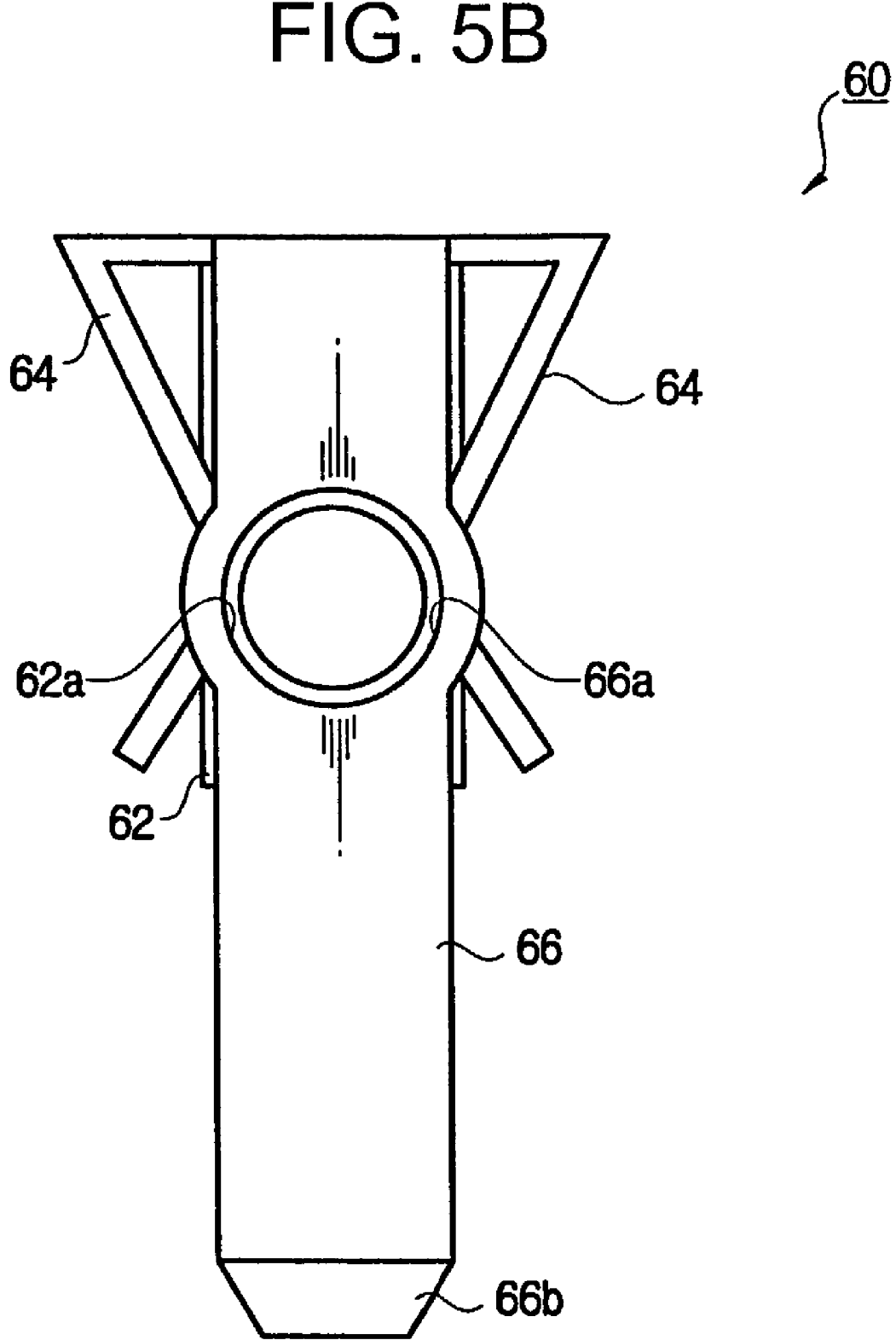

As shown in FIGS. 5A and 5B, the elastic supporting member 60 includes a pair of fixing parts 62 combined to the inside of the rear housing part 40b, and the pair of elastic arms 64 connected to the fixing parts 62 and spaced from each other at a predetermined distance. The elastic supporting member 60 also includes the guiding part 66 incorporated with the fixing parts 62 and the elastic arms 64 as one body, and guides the coupling parts 30.

The fixing parts 62 are fastened to a projection part 52 (see FIG. 4) protruding from the inside of the rear housing part 40b with a bolt 55. The projection part 52 includes, as shown in FIG. 4, a boss part 53 having a screw hole 53a, and a plurality of ribs 54a, 54b, 54c and 54d protruding from the inside of the rear housing part 40b adjacent to the boss part 53. The fixing part 62 is caught on the ribs 54a, 54b, 54c and 54d, and then fastened to the projection part 52 by fastening the bolt 55 to the screw hole 53a of the boss part 53. The fixing part 62 is also provided with a through hole 62a through which the bolt 55 is inserted (see FIG. 5B).

Figure 6A:
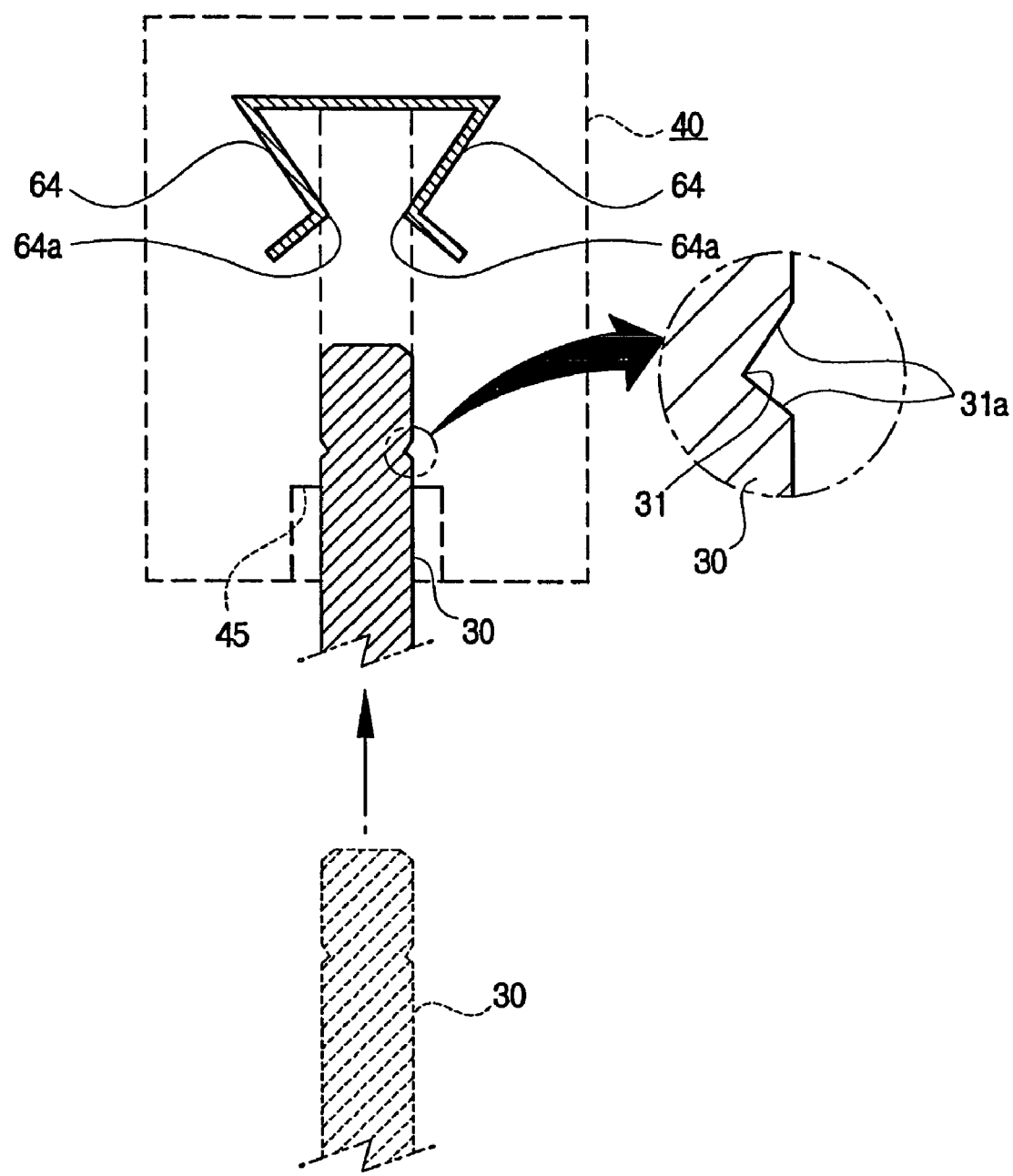
FIGS. 6A–6C are illustrations showing the housing and the coupling part when the main body is combined to and separated from the base member.
Figure 6B:
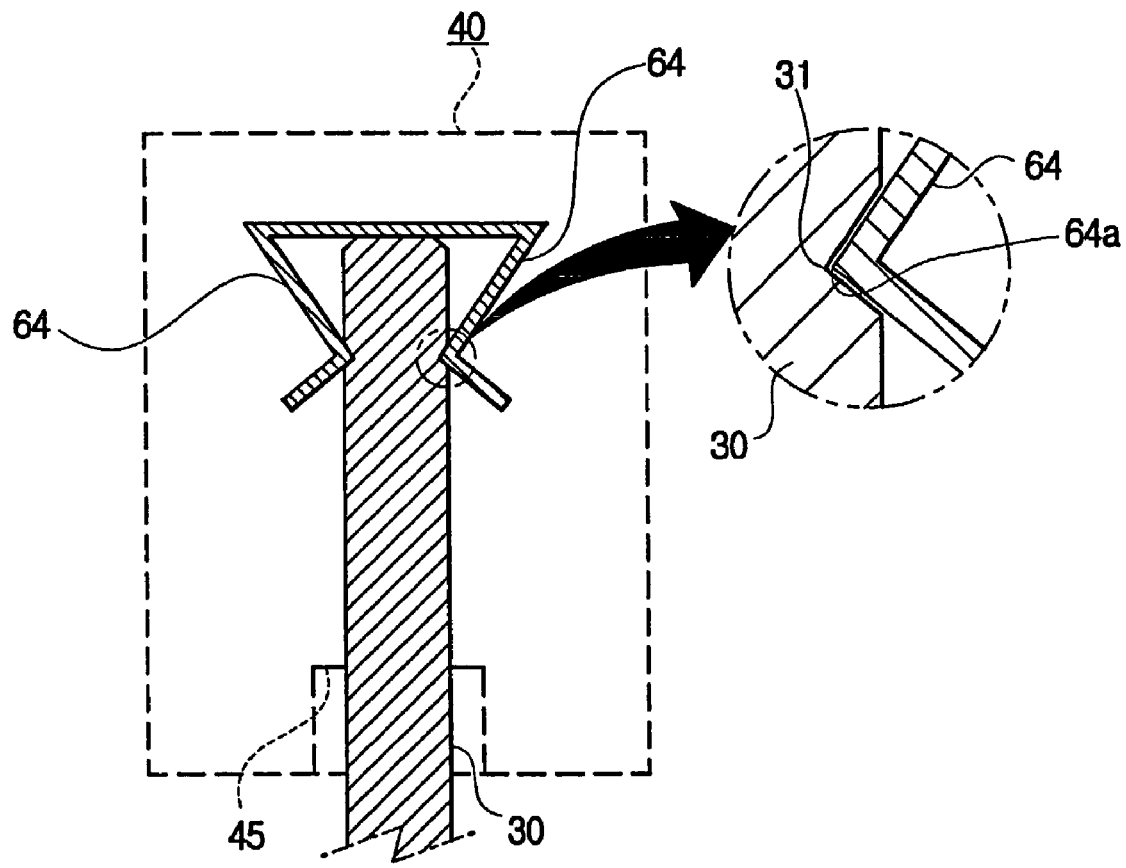

As shown in FIGS. 6A and 6B, the elastic arms 64 are deformed elastically transverse to a combining direction of the coupling part 30 inserted in the housing 40 through an opening 45, thereby elastically supporting the opposite sides of the coupling part 30. The elastic arms 64 have the bent parts 64a which are disposed symmetrically to each other. The corners of the bent parts 64a are latched in and released from the latch grooves 31 provided at the opposite sides of the coupling part 30. Because coupling and releasing of the coupling part 30 against the housing 40 are substantially performed by the elastic arms 64, the elastic arms 64 are preferably made of a plate spring having good elasticity.

The guiding part 66 guides the coupling part 30 to the elastic arms 64 through the opening 45 of the housing 40, thereby allowing the coupling part 30 to be easily latched on the elastic arms 64. The guiding part 66 is equal to the coupling part 30 in width, and a length thereof is relatively long.

As shown in FIGS. 5A and 5B, the guiding part 66 is provided with a tool passing hole 66a through which the bolt 55 and a tool such as a screwdriver are passed to fasten the fixing part 62 onto the boss part 53 of the projection part 52 of the rear housing part 40b. The lower end part of the guiding part 66 is provided with a caught part 66b bent at a predetermined angle and caught in the opening 45 of the housing 40.

Thus, the opposite sides of the guiding part 66 are caught in the pair of fixing ribs 43 provided on the inside of the front housing part 40a, and the caught part 66b of the lower end thereof is caught in the opening 45 of the housing 40, thereby preventing the guiding part 66 from moving laterally. The pair of fixing projections 44 is caught between the guiding part 66 and the elastic arms 64 of the elastic supporting member 60, thereby preventing the guiding part 66 from moving up and down. Therefore, the coupling part 30 to be inserted into the housing 40 through the opening 45 is efficiently guided by the guiding part 66.

The fixing part 62, the elastic arms 64 and the guiding part 66 are integrally made, or separately made and then combined to each other. Particularly, the fixing part 62, the elastic arms 64 and the guiding part 66 are made of plastic or metal.

With the above configuration, a process of partially assembling the monitor will be described hereinbelow.

First, when the front housing part 40a and the rear housing part 40b are separated from each other, the elastic supporting member 60 is mounted on the rear housing part 40b. That is, for example, the fixing part 62 of the elastic supporting member 60 is caught on the ribs 54a, 54b, 54c and 54d of the projection part 52 protruding from the inside of the rear housing part 40b. Then, the fixing part 62 is fastened to the boss part 53 of the projection part 52 by fastening the bolt 55 to the screw hole 53a through the tool passing hole 66a of the guiding part 66.

Thereafter, the front and rear housing parts 40a and 40b, respectively, are joined by making the bosses 51 of the rear housing part 40b be accommodated in the boss accommodating parts 41 of the front housing part 40a. Here, the opposite sides of the guiding part 66 are caught in the pair of fixing ribs 43 provided on the inside of the front housing part 40a, and the caught part 66b of the lower end thereof is caught in the opening 45 of the housing 40. The pair of fixing projections 44 is disposed between the guiding part 66 and the elastic arms 64 of the elastic supporting member 60.

The fixing screws 42 are inserted from the outside of the front housing part 40a into the through holes 41a and then fastened to the screw holes 51a of the bosses 51, thereby combining the front housing part 40a with the rear housing part 40b.

According to an embodiment of the present invention, the housing 40 is provided in a pair. Therefore, two housings 40 are assembled through the above described process.

After the assembling of the housings 40 is completed, the housings 40 are accommodated in the pair of the housing accommodating parts 10a provided at the rear lower part of the main body 10. Further, the coupling parts 30 are partially inserted in the coupling part holders 20a of the base member 20. The housings 40 and the coupling parts 30 may be fastened to the housing accommodating parts 10a and the coupling part holders 20a, respectively, by bolts. Similarly, the housings 40 and the coupling parts 30 may be forcibly fitted in the housing accommodating parts 10a and the coupling part holders 20a, respectively. Thereafter, the base member 20 is easily combined to and removed from the main body 10 as described below.

To combine the main body 10 with the base member 20, the pair of coupling parts 30 fastened to the base member 20, is inserted into the openings 45 of the housings 40 fastened to the rear lower part of the main body 10. Then, as shown in FIG. 6A, the coupling part 30 is guided by the guiding part 66 of the elastic supporting member 60 through the opening 45. Accordingly, as the coupling part 30 is inserted in the pair of elastic arms 64, the latch grooves 31 formed at the opposite sides of the coupling part 30 are latched to the corners of the bent parts 64a of the elastic arms 64 (see FIG. 6B). Thus, the combination of the main body 10 and the base member 20 is easily accomplished.

To separate the main body 10 from the base member 20 when separately packing the main body 10 and the base member 20, or when hanging the monitor on a wall, the main body 10 is pulled out of the base member 20.

Figure 6C:
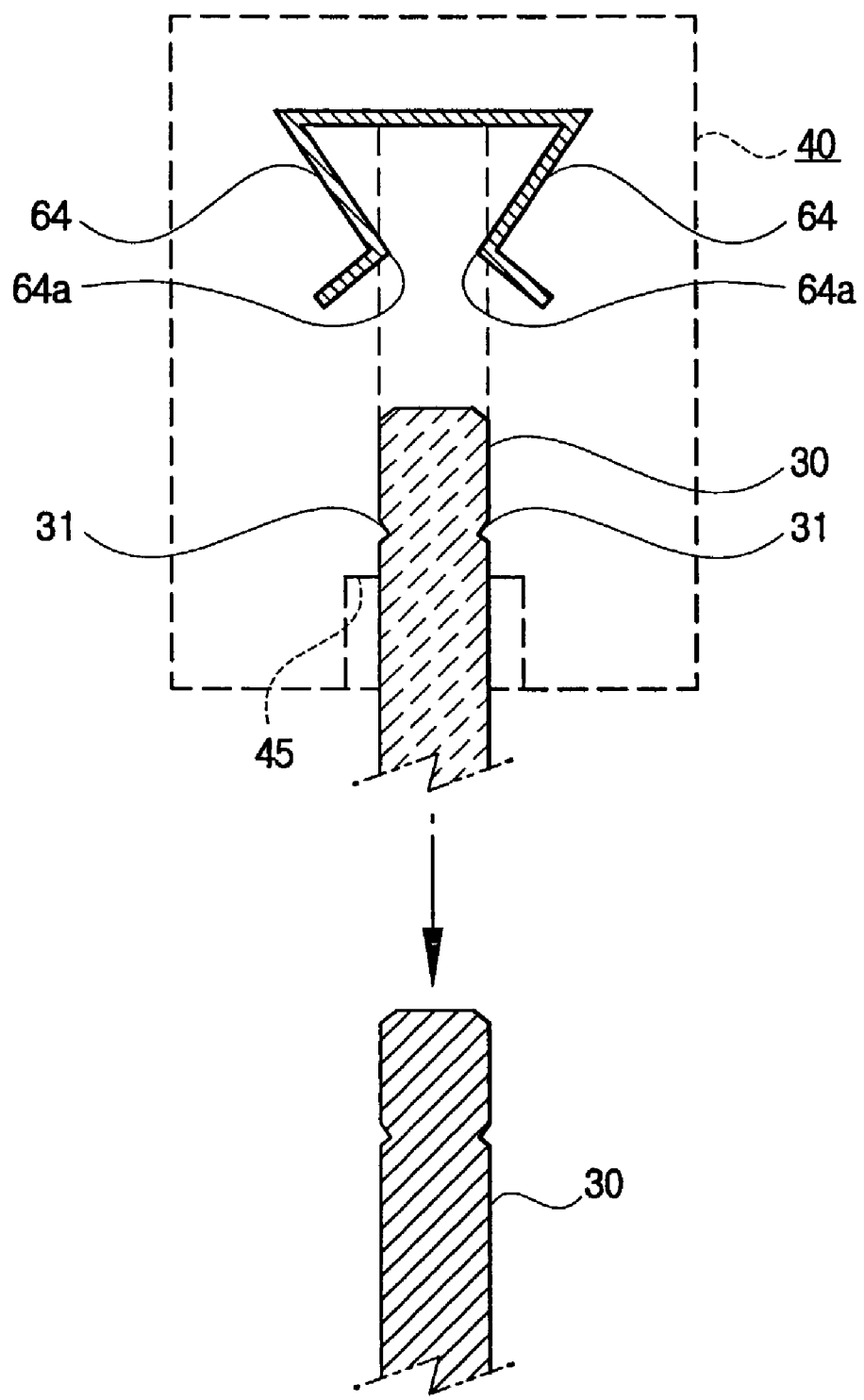

Then, as shown in FIG. 6C, the latch grooves 31 formed at the opposite sides of the coupling part 30 are released from the corners of the bent parts 64a of the elastic arms 64. The coupling part 30 is then guided out by the guiding part 66 and separated from the housing 40 through the opening 45. Thus, the separation of the main body 10 and the base member 20 is easily accomplished.

The housing 40 having the elastic supporting member 60 is manufactured separately from the main body 10 and fastened to the rear lower part of the main body 10. However, according to an embodiment of the present invention, the elastic supporting member 60 may be directly mounted on a main body 10 without a housing.

Figure 7:
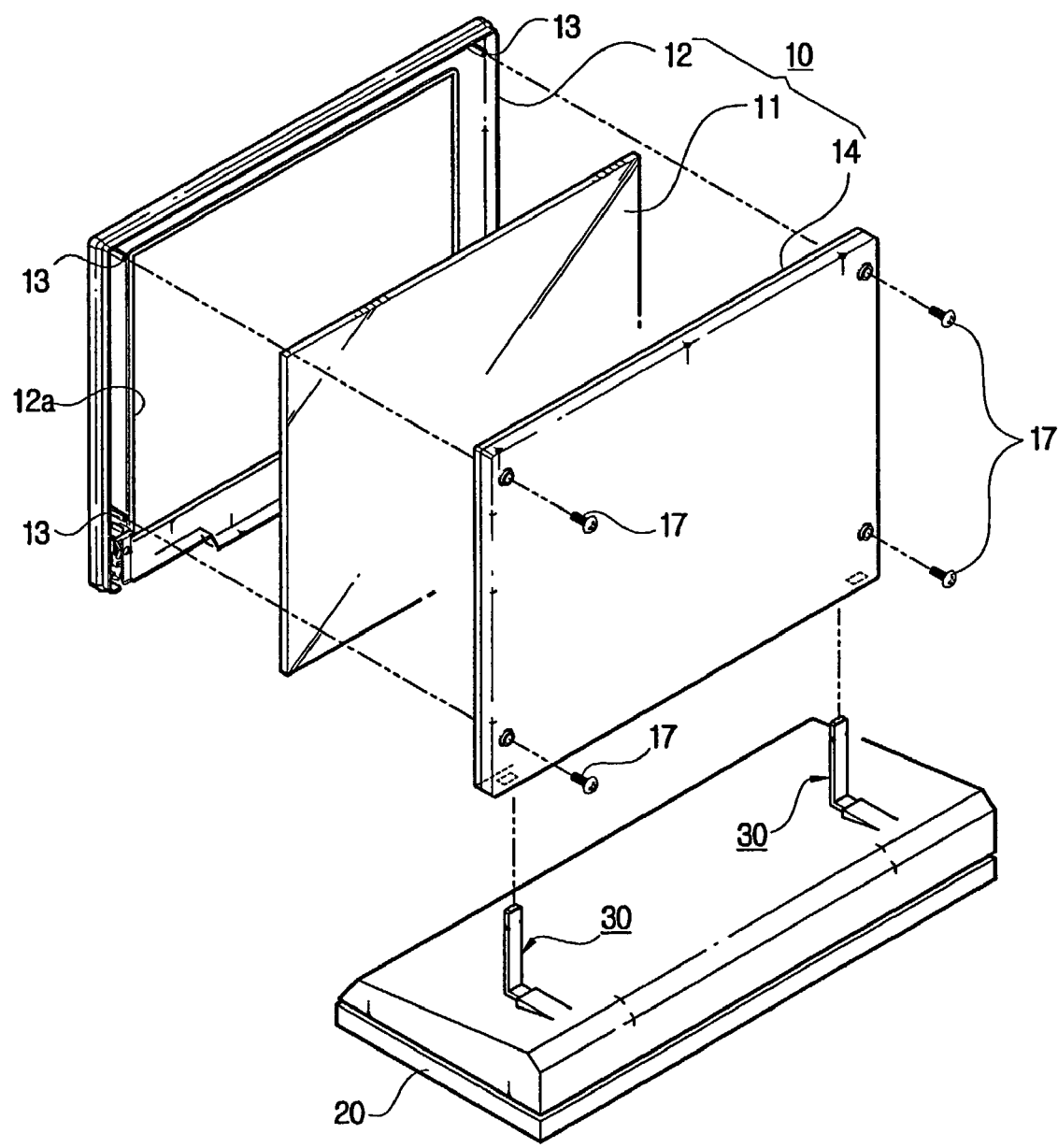
FIG. 7 is an exploded perspective view of a monitor, according to an embodiment of the present invention.

As shown in FIG. 7, the main body 10 according to an embodiment of the present invention includes front and rear covers 12 and 14, respectively, which cover a panel 11 displaying a picture thereon.

The front cover 12 is provided with a display opening 12a through which the panel 11 is exposed. An inside of the front cover 12 adjacent to the display opening 12a is provided with a plurality of bosses 13, each having a screw hole 13a. An inside of the rear cover 14 is provided with a plurality of boss accommodating parts 15 to accommodate the bosses 13, each having a through hole 15a corresponding to the screw hole 13a of each one of the respective bosses 13 (see FIG. 8).

Thus, bolts 17 are inserted from an outside of the rear cover 14 into the through holes 15a of the boss accommodating parts 15, and then fastened to the screw holes 13a of the bosses 13, thereby combining the front cover 12 with the rear cover 14.

Figure 8:
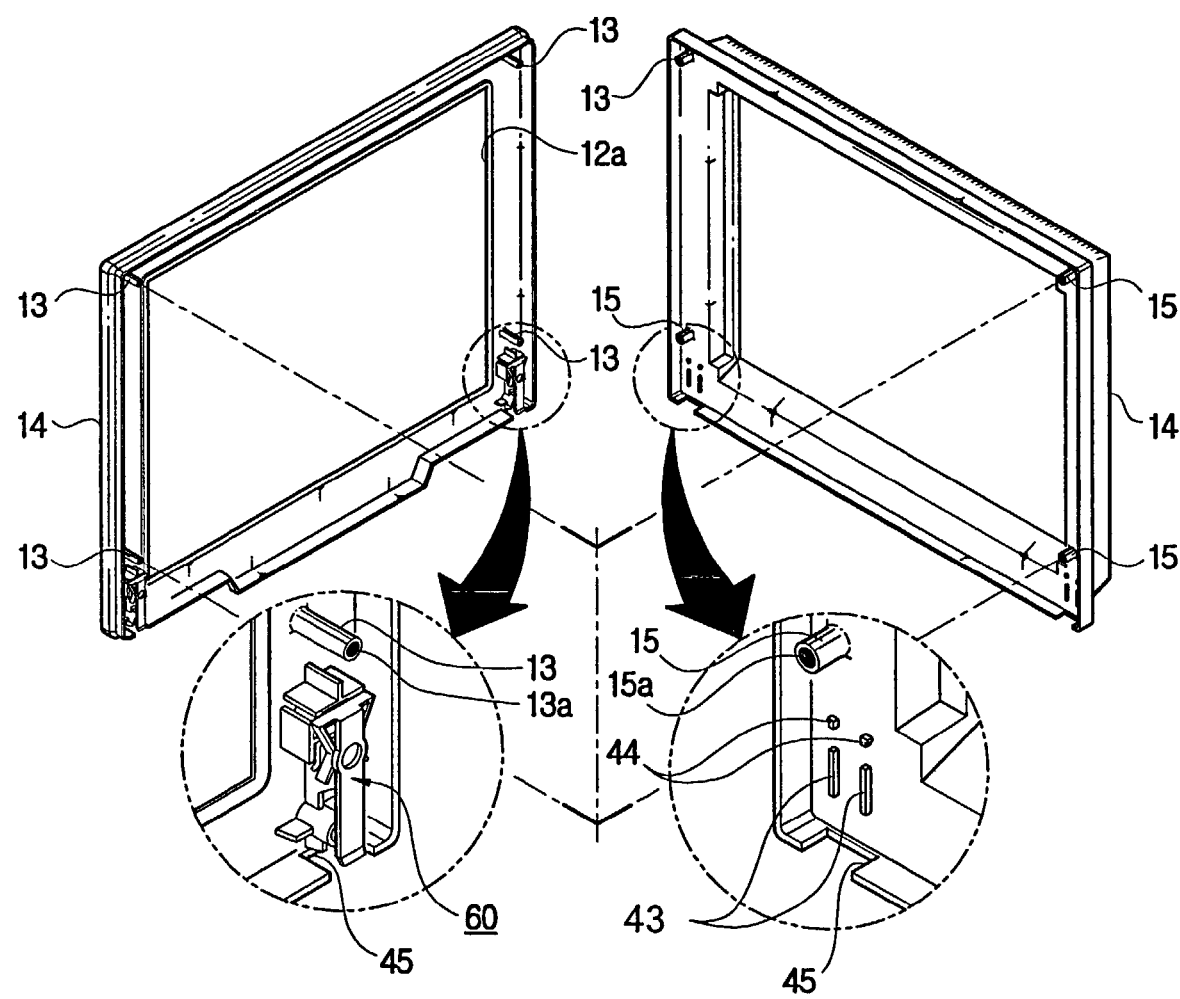
FIG. 8 is an enlarged view showing a main part of the monitor of FIG. 7.
Figure 9:
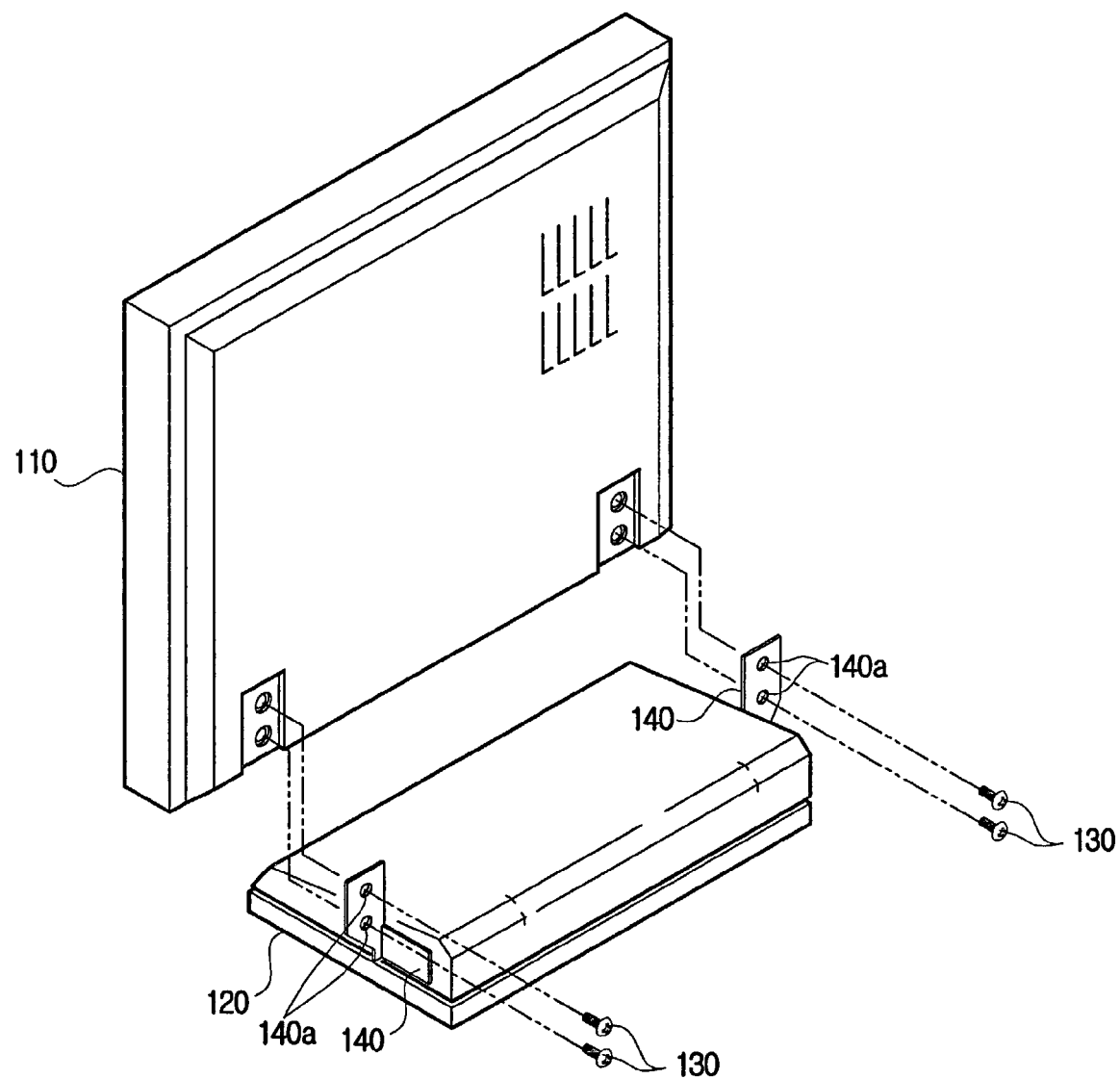
FIG. 9 is a rear perspective view of the conventional monitor.

As shown in FIG. 8, inside opposite lower parts of the front cover 12 are provided with a pair of elastic supporting members 60. Inside opposite lower parts of the rear cover 14 are provided with fixing ribs 43 and fixing projections 44 to catch the elastic supporting members 60 thereon. Further, bottoms of the front and rear covers 12 and 14, respectively, are provided with openings 45 through which coupling parts 30 fastened to a base member 20 are inserted.

With the above configuration, the elastic supporting member 60 is provided between the front and rear covers 12 and 14, respectively, thereby simplifying the manufacturing process.

The elastic supporting member 60 is mounted on the front cover 12. However, the elastic supporting member 60 may be mounted on the rear cover 14, and the fixing ribs 43 and the fixing projections 44 may be provided on the front cover 12.

As described above, the base member 20 is easily combined to and removed from the main body 10, to enable the main body 10 and the base member 20 to be packed separately. A volume of the package is decreased and therefore a cost of storing and carrying is remarkably decreased. Additionally, the monitor 5 is easily altered from a table-type monitor into a wall-type monitor, or vice versa.

Therefore, the present invention provides a monitor in which a base member thereof is easily combined to and removed from a main body thereof.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A monitor having a main body and a base member supporting the main body, comprising:
   a coupling part protruding from one of the main body and the base member toward the other one;
   an elastic member, provided at the other one of the main body and the base member, to elastically support the coupling part; and
   a housing, attached to the one of the main body and the base member toward which the coupling part protrudes, to support the elastic member and through which the coupling part is to be removably inserted,
   wherein the housing includes a front housing part and a rear housing part, and
   wherein the elastic member includes a fixing part fastened to an inside of one of the front and rear housing parts, and a pair of elastic arms, spaced from each other at a predetermined distance, to be deformed in a direction that is perpendicular to a combining direction of the coupling part so to elastically support opposite sides of the coupling part.

2. The monitor according to claim 1, further comprising: a housing accommodating part provided at a rear lower part of the main body to accommodate the housing.

3. The monitor according to claim 1, wherein the elastic arms include bent parts formed substantially symmetrically to each other at a predetermined portion thereof, and
   the opposite sides of the coupling part are provided with latch grooves to latch on corners of the bent parts.

4. The monitor according to claim 3, wherein each of the latch grooves has an inclined portion.

5. The monitor according to claim 1, wherein the elastic member further comprises:
   a guiding part, extended along the combining direction of the coupling part, to be incorporated with the fixing part and the elastic arms as one body, to guide the coupling part and to allow the coupling part to be latched on the elastic arms.

6. The monitor according to claim 5, wherein the guiding part is provided with a tool passing hole.

7. The monitor according to claim 6, wherein a lower end part of the guiding part is provided with a caught part bent at a predetermined angle and caught in an opening of the housing, to substantially prevent the guiding part from moving laterally.

8. The monitor according to claim 7, wherein one of the front and rear housing parts is provided with fixing ribs spaced from each other at a distance as wide as a width of the guiding part and protruding to catch the guiding part.

9. The monitor according to claim 8, wherein the one of the front and rear housing parts provided with the fixing ribs is provided with fixing projections spaced from the fixing ribs at a predetermined distance and disposed between the guiding part and the elastic arms, to prevent the guiding part from moving in a vertical direction.

10. The monitor according to claim 5, wherein the guiding part has a width substantially equal to a width of the coupling part.

11. The monitor according to claim 1, wherein one of the front and rear housing parts is provided with a plurality of bosses protruding therefrom, each of the plurality of bosses having a screw hole; and
   one of the front and rear housing parts is provided with a plurality of boss accommodating parts to accommodate the bosses, each of the plurality of boss accommodating parts having a through hole to correspond to the screw hole of the respective one of the plurality of bosses.

12. The monitor according to claim 11, further comprising:
   a fixing screw to fasten to the screw hole through the through hole, to combine the front and rear housing parts.

13. The monitor according to claim 1, wherein the base member comprises:
   a coupling part holder in which the coupling part is partially inserted.

14. The monitor according to claim 1, wherein the fixing part is fastened to the inside of one of the front and rear housing parts via a projection part protruding therefrom.

15. The monitor according to claim 1, wherein the elastic arms are made of a plate spring.

16. The monitor according to claim 1, wherein the monitor is a table-type monitor or a wall-type monitor.

17. The monitor according to claim 1, further comprising:
   more than one coupling part protruding from the base member toward the main body; and
   more than one elastic member provided at the main body to elastically support the more than one coupling part, respectively.

18. The monitor according to claim 1, wherein a pulling force of a user overcomes a force provided by the elastic member on the coupling part to enable separation of the main body and the base member.

19. A monitor having a main body and a base member supporting the main body, comprising:
   a coupling part protruding from one of the main body and the base member toward the other one;
   an elastic member, provided at the other one of the main body and the base member, to elastically support the coupling part; and
   a housing, attached to the one of the main body and the base member toward which the coupling part protrudes, to support the elastic member and through which the coupling part is to be removably inserted,
   wherein the main body includes a front cover and a rear cover which are removably combined to each other, and
   wherein the elastic member is mounted on an inside of one of the front and rear covers.

20. A monitor comprising:
   a main body;
   a base member supporting the main body;
   a first coupling part protruding from one end of the base member toward the main body;
   a second coupling part protruding from another end opposite said one end of the base member toward the main body and;
   a first elastic member provided at the main body to elastically support the first coupling part and;
   a second elastic member provided at the main body to elastically support the second coupling part so as to removably connect the main body relative to the base member; and
   a housing accommodating part provided at a rear lower part of the main body to accommodate the housing,
   wherein the housing comprises a front housing and a rear housing part, and
   wherein the elastic member includes a fixing part fastened to an inside of one of the front and rear housing parts, and a pair of elastic arms, spaced from each other at a predetermined distance, to be deformed in a direction that is perpendicular to a combining direction of the coupling part so to elastically support opposite sides of the coupling part.

* * * * *